(12) United States Patent
Biear

(10) Patent No.: US 9,910,663 B1
(45) Date of Patent: Mar. 6, 2018

(54) NETWORK-INDEPENDENT MODULAR APPLICATIONS

(71) Applicant: Mackson Consulting LLC, Reston, VA (US)

(72) Inventor: Mary Biear, Vienna, VA (US)

(73) Assignee: Mackson Consulting, LLC, Reston, VA (US)

(*) Notice: Subject to any disclaimer, the term of this patent is extended or adjusted under 35 U.S.C. 154(b) by 0 days.

(21) Appl. No.: 15/440,995

(22) Filed: Feb. 23, 2017

Related U.S. Application Data

(60) Provisional application No. 62/298,697, filed on Feb. 23, 2016.

(51) Int. Cl.
*G06F 9/44* (2006.01)
*G06F 9/445* (2018.01)
*H04L 29/08* (2006.01)

(52) U.S. Cl.
CPC ............... *G06F 8/65* (2013.01); *G06F 8/71* (2013.01); *H04L 67/34* (2013.01)

(58) Field of Classification Search
CPC ..... G06F 8/34; G06F 8/65; G06F 8/71; H04L 67/34
USPC .................................................. 717/104, 105
See application file for complete search history.

(56) References Cited

U.S. PATENT DOCUMENTS

| | | | | |
|---|---|---|---|---|
| 2006/0165123 A1* | 7/2006 | Jerrard-Dunne | .......... | G06F 8/36 370/468 |
| 2008/0222628 A1* | 9/2008 | Batra | ........................ | G06F 8/60 717/171 |
| 2008/0270977 A1* | 10/2008 | Nucci | ........................ | G06F 8/10 717/105 |
| 2012/0089983 A1* | 4/2012 | Chandra | ............ | G06Q 10/0639 718/100 |
| 2012/0221628 A1* | 8/2012 | Fujigaki | ................ | H04L 67/148 709/203 |
| 2012/0233235 A1* | 9/2012 | Allaire | ........................ | G06F 8/36 709/201 |
| 2012/0260232 A1* | 10/2012 | Hirsch | ........................ | G06F 8/20 717/107 |
| 2013/0024851 A1* | 1/2013 | Firman | ........................ | G06F 8/60 717/170 |
| 2013/0305218 A1* | 11/2013 | Hirsch | ........................ | G06F 8/36 717/106 |
| 2013/0326471 A1* | 12/2013 | Nucci | ........................ | G06F 8/10 717/105 |

(Continued)

*Primary Examiner* — Qing Chen

(74) *Attorney, Agent, or Firm* — Fish & Richardson P.C.

(57) ABSTRACT

Systems and methods are described for a platform that allows efficient creation and distribution of application templates. The application templates enable a modular application to run in different application environments. Configuration data is initially downloaded by an electronic device over a computer network from a server system. The configuration data enables the electronic device to execute a locally stored instance of an application on the electronic device. A determination that the electronic device is unable to establish communications with the server system over the computer network is made. In response, the locally stored instance of the application is executed on the electronic device based on the configuration data stored on the electronic device. Data collected by the locally stored instance of the application is then transmitted to the server system.

21 Claims, 7 Drawing Sheets

(56) References Cited

U.S. PATENT DOCUMENTS

| | | | |
|---|---|---|---|
| 2016/0132299 A1* | 5/2016 | Harrison | G06F 9/44505 717/107 |
| 2017/0131974 A1* | 5/2017 | Balasubramanian | G06F 8/20 |

* cited by examiner

NETWORK-INDEPENDENT MODULAR APPLICATIONS

CROSS-REFERENCE TO RELATED APPLICATIONS

This application claims priority to U.S. Application Ser. No. 62/298,697, filed on Feb. 23, 2016, which is incorporated by reference in its entirety.

TECHNICAL FIELD

This specification generally relates to applications.

BACKGROUND

Application software for electronic devices can provide useful functionality to users. A mobile application is a type of application software that is designed to run on a mobile device, such as a smartphone or tablet computer. Mobile applications often provide users with similar services to those accessed on a desktop computing environment, but in a packaged form with limited and/or isolated functionalities.

Mobile applications are often associated with an application server within a software framework. For example, web-based mobile applications often display electronic content that is obtained from a web server that stores the electronic content. In this example, the server operates similar to an extended virtual machine for running applications, handling connections to database, and connections to a web client. In other examples, an application provides services that are made available by the application server using computer hardware on which the services run.

SUMMARY

Mobile applications often require persistent connectivity with an application server to provide certain capabilities. For example, when application services are remotely executed on the application server, these services are often unable to be performed locally when a client device that runs the application has limited or no network connectivity, e.g., limited Wi-Fi or cellular connectivity. This limitation often makes it challenging for organizations such as government agencies to use mobile applications to collect data from investigative deployments in network-constrained environments. In such instances, if real-time data communications are needed, they are often enabled using cellular or satellite communications, which often impose higher data transmission costs compared to data transmissions over an Ethernet-based connection.

To address these limitations, a system provides a platform that allows efficient creation and distribution of application templates that enable a modular application to run in different application environments. Various organizations can customize the application templates to meet their operational needs. For example, the system allows an organization to customize the application template to enable uniquely tailored features such as offline geographic information system (GIS) capabilities, generating dynamic user forms, automating document collection and synchronization, among others.

An organization may use the system to design different application templates to support multiple investigative capabilities across multiple client devices. An application template can define different sets of application functionalities and settings to enable a single application to be run on multiple client devices and in multiple environmental conditions (e.g., in a limited network connectivity setting). For example, different application templates can be designed for collecting field data related to an ongoing investigation, threat detection and tracking, asset management, and system performance assessments. In other examples, different application templates can be used for life-critical deployments where real-time communications are needed, and other types of deployments where data communications can be deferred to reduce transmission costs.

In addition, the system can be implemented to enable various capabilities relating to investigational operations. As examples, the system can be implemented to support investigations, fraud management, public health monitoring and outreach, inspection planning and execution, provisioning of emergency services, among others. The system can generate different application templates for each of these capabilities, which enables the organization to use a single application to accomplish multiple organizational objectives.

The architecture of the system generally includes an administrator system where an administrator of an organization can design and update application templates for a modular application, an application server for providing services for the application, and multiple client devices that have the application installed. The administrator can design the application template using a publisher interface that allows for customization based on a selection of various application features and settings. The application server then processes the application template designed by the administrator and generates a customized application template that configures the execution of the application on the client devices.

In addition, the architecture of the system enables the system to address various problems that arise in the networked environment of mobile applications. As described above, an application instance on a client device often requires persistent connectivity with an application server to properly run on the client device. This often limits the usability of such mobile applications in network-constrained environments where the mobile application is unable to connect to a computer network to access services and functions are remotely executed on the application server. As described in more detail below, the architecture of the system addresses this problem by, among other techniques, employing the use of application templates that are locally run on a client device to enable the execution of a locally stored application instance on a client device with limited or no network connectivity. The application templates include a collection of data, web and application programming interface (API) layers that configure and support the locally stored application instance on the client device. This enables a user to fully use the application during times of limited or no network connectivity to collect data through the local application instance. Moreover, the application template can specify a data synchronization scheme that enables the client device to automatically determine when it has regained network connectivity (e.g., determining that the client device has connected to a network without receiving user input), and upload data collected through the locally stored application instance onto the application server.

In one aspect, a computer-implemented method can include: storing, by an electronic device, configuration data downloaded over a computer network from a server system, the configuration data enabling the electronic device to execute a locally stored instance of an application on the electronic device; determining, by the electronic device, that the electronic device is unable to establish communications with the server system over the computer network; in response to determining that the electronic device is unable to establish communications with the server system over the computer network, executing, by the electronic device, the locally stored instance of the application on the electronic device based on the configuration data stored on the electronic device; collecting, by the electronic device, geospatial data of the electronic device in real time while the electronic device is unable to establish communications with the server system; determining, by the electronic device, that the electronic device is capable of establishing communications with the server system over the computer network; and in response to determining that the electronic device is capable of establishing communications with the server system, transmitting, to the server system, data collected by the locally stored instance of the application.

One or more implementations can include the following optional features. For example, in some implementations, the method further includes: identifying one or more components of the application that are determined to have dependencies associated with one or more components of the server system; identifying one or more components within the stored configuration data that correspond to the one or more components of the server system; and reconfiguring the one or more components of the application based on the one or more identified components within the stored configuration data.

In some implementations, the method further includes transmitting, by the electronic device, the collected geospatial data of the electronic device to the server system over a second computer network while the electronic device is unable to establish communications with the server system over the computer network.

In some implementations, the method further includes preventing transmission of the collected data collected by the locally stored instance of the application while the electronic device is unable to establish communications with the server system over the computer network.

In some implementations, the data collected by the locally stored instance of the application includes user input data associated with an investigative deployment.

In some implementations, the configuration data includes at least a first application template and a second application template. In such implementations, the first application template includes a first set of instructions for the electronic device to execute the application while the electronic device is unable to establish communications with the server system over the computer network. The second application template including a second set of instructions for the electronic device to execute the application while the electronic device is capable of establishing communications with the server system over the computer network.

In some implementations, the first application template and the second application template are customized for an organization associated with the electronic device.

Other versions include corresponding systems, and computer programs, configured to perform the actions of the methods encoded on computer storage devices.

In another aspect, a computer-implemented method includes: providing, by a server system, a user interface for designing an application template that configures execution of an application on multiple different types of electronic devices, the user interface identifying multiple configuration settings for the application template; receiving, by the server system, data indicating a user input received through the user interface that selects one or more of the multiple configuration settings for the application; receiving, by the server system, customization parameters that customize the application template for a particular organization; generating, by the server system, a customized application template for the particular organization based on the selected configuration settings and the customization parameters; and publishing, by the server system, the customized application template for the particular organization, the customized application template comprising instructions that locally execute a locally stored instance of the application on one of the different types of electronic devices when the electronic device is determined to be unable to establish communications with the server system.

In some implementations, the multiple configuration settings for the application template includes a list of predetermined user-selectable configuration settings for the application.

In some implementations, the user interface for designing the application template additionally identifies a set of data synchronization configurations for the application.

In some implementations, the customization parameters comprise information related to investigative deployments that are conducted by the particular organization.

In some implementations, the customization parameters specify one or more application environments associated with the investigative deployments that are conducted by the particular organization.

In some implementations, the multiple configuration settings include: a first set of instructions to execute the application while an electronic device is unable to establish communications with the server system, and a second set of instructions to execute the application while the electronic device is capable of establishing communications with the server system.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

Figure 1:
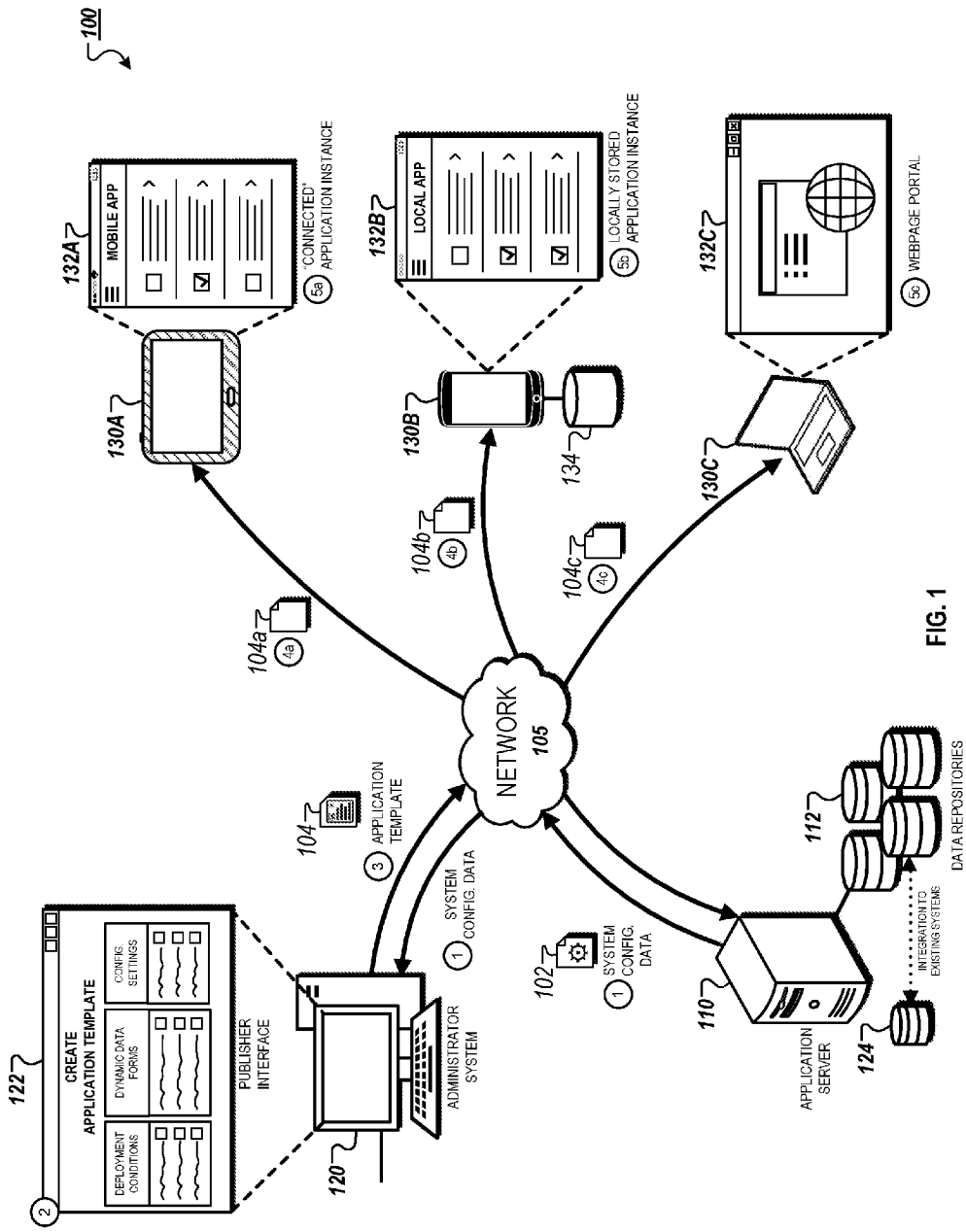
FIG. 1 illustrates an example of a system that is capable of executing a modular application on various client devices.

In general, a system provides a platform that allows efficient creation and distribution of application templates that enable a modular application to run in different application environments. Various organizations can customize the application templates to meet their operational needs. For example, the system allows an organization to customize the application template to enable uniquely tailored features such as offline geographic information system (GIS) capabilities, generating dynamic user forms, automating document collection and synchronization, among others.

The architecture of the system generally includes an administrator system where an administrator of an organization can design and update application templates for a modular application, an application server for providing services for the application, and multiple client devices that have the application installed. The administrator can design the application template using a publisher interface that allows for customization based on a selection of various application features and settings. The application server then processes the application template designed by the administrator and generates a customized application template that configures the execution of the application on the client devices.

As described throughout, a "modular application" refers to a native mobile or desktop application that is constructed in such a manner that its features, configurations, and/or execution can be dynamically adjusted by a designated user (hereinafter referenced as an "administrator"). For example, a modular application may include application components (e.g., frameworks, services, user interface elements) that are fully customizable and adjustable to satisfy the needs and/or requirements of an organization. As described in greater detail below, the configuration of the modular application can be adjusted to enable different types of client devices to run the application. In addition, the configuration of the modular application can also be adjusted over time to enable a single client device to run the application in different environmental conditions (e.g., when the client device has network connectivity or when the client device is unable to establish network connectivity).

As described throughout, an "application template" refers to a collection of data (e.g., configuration files, electronic content, user interface elements, etc.) associated with a modular application. As described in greater detail below, an application template includes the data needed to execute the modular application on a client device. In some implementations, the application template includes all such data that is needed to run a locally stored application instance that does not require persistent network connectivity with an application server associated with the modular application. In such implementations, the application template includes all data that is needed to enable the client device to provide application functionalities during time periods when the client device has limited and/or no network connectivity.

As described throughout, an "administrator" refers to a user of an organization that performs certain actions related to the design, configuration, and/or implementation of a modular application to be executed on client devices associated with the organization. For example, the administrator may select and/or specify configuration settings that are used to generate application templates for the modular application. In other examples, the administrator may configure an associated system of the organization (e.g., hereinafter referred as "administrator system") to perform administrative tasks associated with the implementation of the modular application (e.g., specifying user privileges, adding/removing user accounts, managing user credentials, creating user assignments, etc.). In some implementations, the organization may include different administrators that perform distinct operations relating to the modular application. For example, one administrator may design the application templates for configuring the application templates, whereas another administrator may perform various administrative operations relating to the use of the modular application by end-users.

As described throughout, "real-time" refers to information or data that is transmitted, collected and/or processed with minimal delay after the occurrence of a specified event, condition, or trigger. For example, "real-time geospatial data" refers to geospatial data (e.g., measured longitude and latitude, etc.) that is processed with minimal delay after a satellite detects an estimated location of an electronic device. The minimal delay in collecting and processing the real-time geospatial data can be based on a sampling rate of the satellite that collections positional data of the electronic device, and a time delay associated with processing collected geospatial data. As another example, "real-time communications" refers to communications between two or more electronic devices where a receiving device receives a communication with minimal delay after a transmitting device transmits the communication (e.g., 100 ms between communications/updates, 1-2 seconds between communications/updates, or 5-10 seconds between communications/updates). The minimal delay in collecting and processing the real-time communications can be based on a network speed of the communication network used to transmit the communication.

FIG. 1 illustrates an example of a system 100 that is capable of executing a modular application in various client devices. In the example, the system 100 includes an application server 110, an administrator system 120, and client devices 130A, 130B, and 130C that exchange communications over a network 105. As described in more detail below, the administrator system 120 provides a publisher interface 122 that enables an administrator to design application templates for the modular application. The client devices 130A, 130B, and 130C provide application interfaces 132A, 132B, and 132C, respectively, of the modular application for output to a user (e.g., an end-user that uses the modular application). The application server 110 performs various functions relating to the modular application and further includes data repositories 112.

In general, the system 100 enables the administrator to customize the configuration of the modular application to suit the needs of an associated organization. For example, the organization can be an entity that performs investigational operations such as a government agency. Once the administrator has designed a customized application template, components of the system 100 publish and distribute the customized application template over the network 105 to the client devices 130A, 130B, and 130C. The device-specific version of the modular application configures the application template for execution on the client devices 130A, 130B, 130C.

The example illustrated in the figure proceeds in five stages, represented in the figure as stages "(1)," "(2)," "(3)," "(4)," and "(5)." Alternative pathways of the same stage for different client devices are designated with modifiers "a," "b," and "c" (e.g., "4a," "4b," "4c"). At stage (1), the application server 110 initially generates system configuration data 102 to enable the administrator system 120 to provide the publisher interface 122 for output to an administrator. The system configuration data 102 can include, for example, information for the organization associated with the administrator system 120, a set of pre-generated application templates that can be customized on the publisher interface 122 based on the information for the organization, a list of previously configured application templates for the organization, among others.

At stage (2), the administrator system 120 provides the publisher interface 122 for output to the administrator based on the system configuration data 102. The administrator then provides input through the publisher interface 122 that specifies application features, settings, and configurations to be included in a newly created or recently updated application template. For example, the administrator may specify mobile operating systems for running the modular application, environmental conditions during which the modular application is to be executed (e.g., a persistent network-enabled environment or a disconnected environment), or a data synchronization scheme between a client device and the application server 110 (e.g., real-time data uploads, uploads based on network availability, etc.). In some implementations, the administrator may also configure dynamic user forms to display through the modular application.

At stage (3), once the administrator has designed the application template, the administrator system 120 distributes a customized application template 104 over the network 105 to the client devices 130A, 130B, and 130C. At stage (4), application configuration data associated with the customized application template 104 are distributed to the client devices 130A, 130B, and 130C over the network 105. At stage (5), each of the client devices 130A, 130B, and 130C then configures and executes an instance of the modular application based on the data included within the corresponding application configuration data.

In the example depicted in the figure, the application template 104 specifies three different application configurations (e.g., configuration data 104a, 104b, and 104c) for executing a modular application in three distinct application environments (e.g., a connected application instance, a locally stored application instance, a webpage portal) and on three types of client devices (e.g., a tablet computing device, a smartphone, and a laptop computing device).

In the first example, application configuration data 104a is transmitted to the client device 130A to enable the execution of a "connected" application instance. In this example, the client device 130A has persistent network connectivity to the network 105 to periodically exchange data transmissions with the application server 110. The application server 110 may remotely run or host application services that are then made available through the interface 132A of the application running on the client device 130A. This type of application configuration can be used for life-critical investigational deployments where data collected by the modular application is time-sensitive and requires immediate monitoring.

In the second example, application configuration data 104b is transmitted to the client device 130B and stored in a local storage device 134. The client device 130B then executes a local application instance of the modular application based on the data stored within the local storage device 134. In this example, the application configuration data 104b enables the client device 130B to locally run application services and/or features during time periods when the client device 130B has limited connectivity to the network 105. As described in greater detail below with respect to FIG. 3, the client device 130B may store the application configuration data 104b, and then use the included data to execute all necessary services and features through the interface 132B of the modular application locally running on the client device 130B. This type of application configuration can be used for investigational deployments where the costs of real-time data transmission via alternative means (e.g., a cellular or satellite network) may be prohibitively expensive compared to utility of immediate monitoring capabilities.

In the third example, the application configuration data 104c is transmitted to the client device 130C to enable the execution of the application through a web-based interface 132C. In this example, the application configuration data 104c enables the client device 130C to provide a webpage portal, as opposed to a native application, to access services and/or features that are run and/or hosted on the application server 110. In this regard, the application template can be used to configure either application capabilities or web-based capabilities as described throughout.

The examples depicted in the figure and described above relate to implementations where an application template specifies a single configuration of the application. In some implementations, however, an application template specifies multiple application configurations for a single client device, and triggers/conditions associated with each application configuration. In such implementations, the application template enables a client device to dynamically configure the modular application based on detected data indicating that an associated trigger or condition has been satisfied. For example, an application template may specify a first configuration when the client device has network connectivity (e.g., corresponding to the connected application instance as shown in interface 132A) and a second configuration when the client device does not have network connectivity (e.g., corresponding to the locally stored application instance as shown in interface 132B). In this example, the client device may store the application template and may adjust select an application configuration based on monitoring the network connectivity of the client device. In another example, the client device may provide a user with a notification that the trigger or condition has been satisfied and allow the user to provide an input that then instructs the client device to adjust the configuration of the application.

Referring now to the components of the system 100, the application server 110, the administrator system 120, and the client devices 130A, 130B, and 130C exchange communications over the network 105. The network 105 can be a secured (e.g., private) network or an open (e.g., public network). The network 105 can be a circuit-switched data network, a packet-switched data network, or any other network able to carry data, for example, Internet Protocol (IP)-based or asynchronous transfer mode (ATM)-based networks, including wired or wireless networks. The network 105 can be configured to handle web traffic such as hypertext transfer protocol (HTTP) traffic and hypertext markup language (HTML) traffic. The network 105 can also include one or more of the Internet, Wide Area Networks (WANs), Local Area Networks (LANs), analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network such as an intranet, radio, television, cable, satellite, and/or any other delivery or tunneling mechanism for carrying data, or any appropriate combination of such networks.

The application server 110 can be any type of web server configured to run, host, and/or support application services and other functionalities associated with a modular application that is run on the client devices 130A, 130B, and 130C. In some implementations, the application server 110 resides within a middle-tier of the architecture of the system 100 (e.g., a web server hosting IIS) and provides middleware services related to, for example, security and slate maintenance, along with database access and persistence associated with the repositories 112. In such implementations, a modular application that runs on the client devices 130A, 130B, and 130C can be configured to utilize suitable data store and/or database processes to obtain data stored within the repositories 112.

The application server 110 is capable of using different services, frameworks and/or platforms to enable a modular application to be hosted in suitable application environments of different types of client devices. For example, the application server 110 can use an ASP.NET model-view-control (MVC) framework, a Web API framework, among others. As described throughout, this capability of the application server 110 enables an administrator to design a customized application template that provides flexibility in designing various functions, capabilities, and/or runtime options for a modular application to be run on the client device 130A, 130B, and 130C.

As an example, an organization may store their data in an existing database system 124 (e.g., an SQL server database) that has limited compatibility with certain services, frameworks, and/or platforms. In this example, when designing an application template on the publisher interface 122, the administrator may select the appropriate services, platforms, and/or frameworks for the application server 110 to run and/or host to enable the modular application that runs on one or more of the client devices 130A, 130B, and 130C to access data associated with the existing system. The application server 110, and its use of application templates, therefore provides flexibility to the administrator in choosing configuring settings to enable the modular application to easily integrate with existing backend systems associated with the administrator system 120.

The application server 110 includes one or more processors and one or more computer-readable storage media (e.g., the data repositories 112). The data repositories 112 can include databases that are stored locally within a database cluster where the application server 110 is physically located, or remotely located databases that are configured to exchange communications with the application server 110 over a network interface (e.g., the network 105). For example, the data repositories 112 can include local databases that store data associated with a modular application. As another example, the repositories 112 exchange communications with existing database systems 124 that are associated with the administrator system 120 after an administrator has registered the administrator system 110 with the application server 110. In some implementations, the data repositories 112 can include a combination of local and remote databases that are configured to exchange communications with the application server 110.

The application server 110 periodically exchanges communications with the administrator system 120 and the client devices 130A, 130B, and 130C. For example, the application server 110 transmits system configuration data 102 to the administrator system 120 and then processes user input data received on the publisher interface 122. In another example, the application server 110 transmits data used to run the modular application on the client devices 130A, 130B, and 130C, and periodically obtains data collected by the modular application (e.g., investigative data submitted through the modular application). Specific components of the application server 110 that perform these operations are described in greater detail below with respect to FIG. 2A.

The administrator system 120 can be an electronic device, or a combination of electronic devices, that are associated with a particular organization that performs investigative operations. For example, the administrator system 120 can be a system of computing devices that are associated with a government agency. In other examples, the particular organization can be a non-governmental entity such as a private or public government contracting agency. In some implementations, the administrator system 120 can include existing enterprise systems 124 that are used by an organization to perform various operations (e.g., data collection, processing, aggregation, etc.).

The administrator system 120 also includes various types of software used by an organization to perform its investigative operations. For example, the administrator system 120 can include enterprise application software (EAS), customer relationship management (CRM) software, commercial off-the-shelf (COTS) software, and customized software used specifically by the particular organization.

The administrator system 120 provides the publisher interface 122 for output to an administrator to allow the administrator to provide user input associated with a modular application that is executed on the client devices 130A, 130B, and 130C. For example, as described in more detail with respect to FIG. 2B, the administrator may design a new customized application template and/or adjust an existing application template for the modular application. The customized application template then configures the interaction between the application server 110 and/or the client devices 130A, 130B, and 130C to enable the execution of the modular application according to the settings specified by the administrator. Examples of application settings that can be specified by the administrator are provided below with respect to FIG. 2B.

The client devices 130A, 130B, and 130B can be any type of personal electronic computing devices that are capable of running a modular application that is associated with the application server 110. The client devices 130A, 130B, 130C can be a smartphone, a tablet computing device, a notebook computing device, a smart wearable device, or a desktop computing device. In the example illustrated in FIG. 1, the client device 130A represents a tablet computing device, the client device 130B represents a smartphone, and the client device 130C represents a laptop computing device. As described throughout, the modular application can be configured to be executed under different environmental conditions (e.g., different operating systems associated with different types of client devices). In some implementations, the application features described throughout are provided through a webpage (e.g., the webpage 132C).

As described above, the architecture of the system 100 enables an organization to design applications that are in compliance with all organizational needs and/or regulatory requirements for data collection, storage, and reporting. For example, in implementations where the organization is a U.S. federal government agency, the system 100 can be used to configure a modular application that is in compliance with the Federal Information Security Management Act (FISMA). In such implementations, the application can support digital signatures for authentication, provide chain of custody for collected data, and enable stakeholders to develop custom alerts and predictive parameters.

Figure 2A:
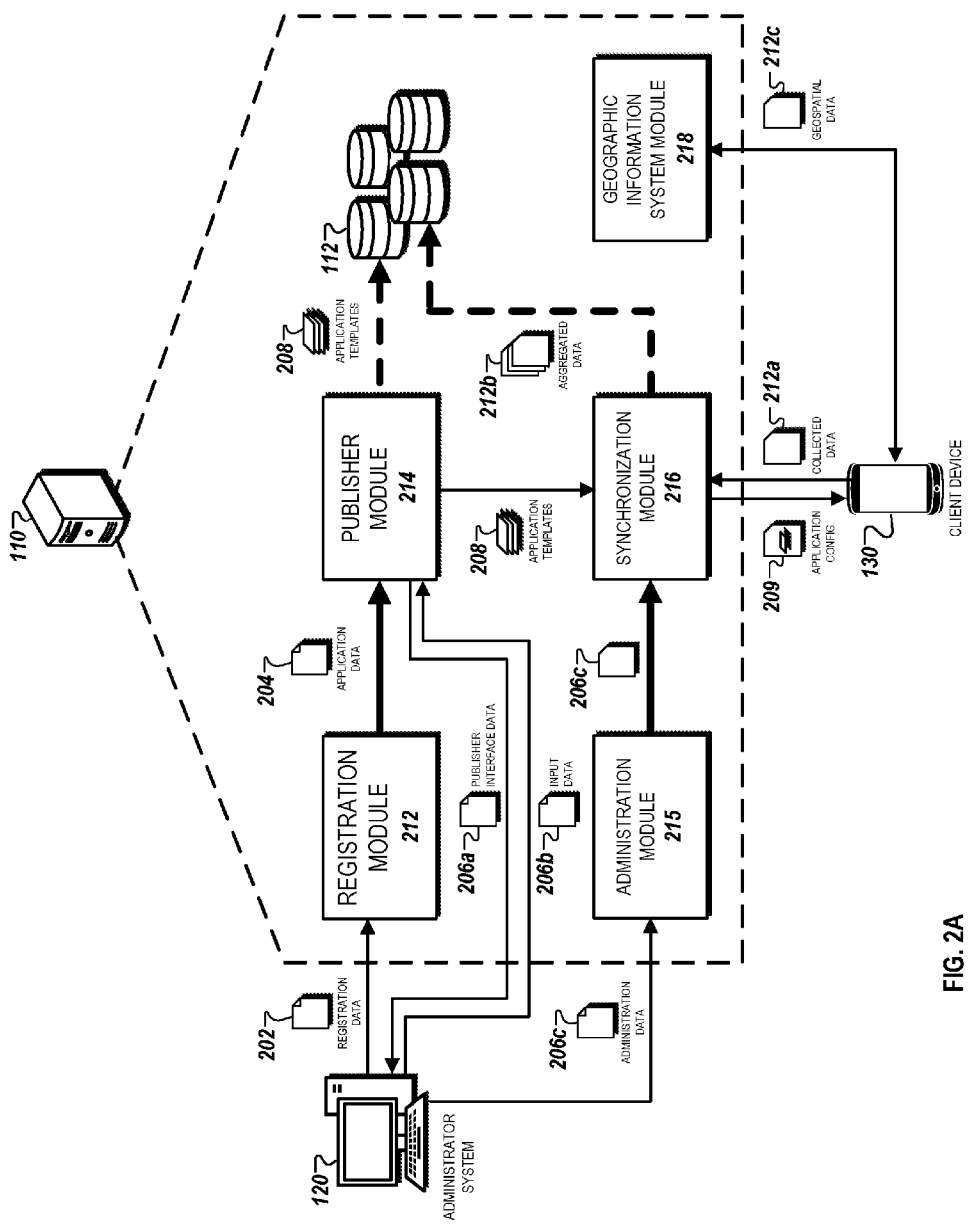
FIG. 2A illustrates an example of an application server that processes data associated with a modular application.

FIG. 2A illustrates an example of the application server 110 that processes data associated with a modular application. The application server 110 includes components that each process data obtained from, for example, the administrator system 120 and the client device 130. As shown, the application server 110 includes a registration module 212, a publisher module 214, an administration module 215, a synchronization module 216, a geographic information system (GIS) module 218, and the data repositories 112. Each of these modules can represent software modules that are executed by one or more processors of the application server 110 using instructions stored on computer-readable medium within, for example, the repositories 112.

In general, the modules of the application server 110 collect, process and transmit data at various time points of the software development lifecycle of a modular application. For instance, the registration module 212 provides a registration service that allows an administrator from a newly associated organization to submit registration data 202. The registration data 202 includes, for example, organization information, functional and/or technical requirements for a modular application to be used, security or authentication requirements for the organization, specification of administrative privileges for accessing and/or using the modular application, or other types of organizational information.

As an example, once the registration module 212 processes the registration data 202, the application server 110 generates a profile for the organization that is then stored within a database within the repositories 112. The profile includes the information associated with the organization, and can optionally include pre-generated application templates specifying baseline configurations for modular applications to be used by the organization. The pre-generated application templates can be selected by the registration module 212 based on the information included within the registration data 202. For example, if the organization conducts a particular type of investigation such as threat tracking in a specified geographic region, the registration module 212 may select a set of pre-generated application templates that are either associated with threat tracking, the specified geographic region, or a combination of both.

Once registered and associated with the application server 110, the registration module 112 enables the application server 110 to provide a configured environment where an administrator of an organization can design and configure a modular application that is executed on various client devices, as described above in FIG. 1. The registration process through the registration module 212 provides the application server 110 with information associated with the administrator system 120 to provide a publisher interface (e.g., the publisher interface 122 as illustrated in FIG. 1) where the administrator can configure application templates for the modular application.

Registration data that is collected during the registration process by the registration module 212 is used to by the application server 110 to generate application data 204. The application data 204 includes information relating to the administrator system 120 that enables the publisher module 214 to provide a publisher interface (e.g., the publisher interface 122) in an application environment that is isolated from the application server 110 (e.g., executed locally on the administrator system 120). This enables an administrator to configure the modular application locally on the administrator system 120 without being susceptible to any attacks on the application server 110. In addition, the registration process protects the configuration of the modular application publisher interface 122 on the by protecting against unauthorized configurations of the modular application by users of the organization without sufficient configuring privileges or users that are not associated with the organization.

As described above, the publisher interface can be a webpage portal and/or an application interface made available on the administrator system 120. An administrator associated with the organization can use the publisher interface to provide input data 206b corresponding to, for example, customizing new application templates for a modular application to be run on client devices associated with the organization, editing configuration settings for existing application templates, viewing data previously collected by the client devices in prior application instances, among others.

The publisher module 214 processes input data 206b received on the publisher interface to generate various types of application configuration data. In the example depicted in FIG. 2A, the publisher module 216 processes input data 206b, including application template design data, to generate application templates 208. The application templates 208 includes a collection of data, files, and associated information that enables the application server 110 and/or the client device 130 to configure and run applications corresponding to the application templates 208.

The publisher module 214 can store the application templates 208 within the repositories 112. For example, if an administrator designs a new application template for a modular application to be implemented at a later time point, then the publisher module 214 stores the new application template within the repositories 112 until the administrator provides instructions to publish the application template.

The administration module 215 provides an administration interface that enables the administrator to perform various management functions associated with applications that are run through the application server 110. For example, the administrator can use the administration interface to provide administration data 206c that includes various types of information associated with the management of the modular application. For example, the administration data 206 can include instructions to organize and manage teams of users that each use the modular application, various schedules for assignments related to investigative deployments, created catalogs of different types of investigations performed by the organization, documentation information associated with completed investigative deployments, and/or management location-based information associated with investigative field work.

In addition, as described in more detail below with respect to FIG. 3, the administration interface enables the administrator to configure the modular application to enable the modular application to be used as a real-time geographic information system (GIS). This capability enables the modular application to track geospatial information associated with application instances running on client devices when the client devices are located in remote field sites with limited network connectivity.

The administration module 215 additionally provide other types of interfaces to allow an administrator to perform other various functions associated with the modular application after the application templates 208 have been designed and generated. For instance, the administrator may use the administration interface (e.g., on a webpage portal) to define security settings for accessing the modular application, configure user permissions for using specific features and/or performing specific functions on the application, or specifying authentication methods to access data on the modular application.

The administrator can also use the administration interface to specify business workflow management features associated with the modular application. For instance, the administrator may coordinate logistics for an upcoming deployment (e.g., associating tasks to groups of users, specifying document upload protocols to preserve document security and authenticity, etc.). The administrator can also specify a set of triggers and associated conditions for performing system actions based on the occurrence of one or more triggers or conditions. For example, in response to receiving a data upload from the client device 130, the administrator may specify a designated data processing scheme that reformats or restructure the data format in manner that is capable of being processed by an existing enterprise data processing system associated with the administrator system 120 (e.g., the existing enterprise data system 124).

The business workflow management features may additionally include settings that enable an administrator to specify how data collected through a modular application are processed by the administrator system 120. For example, the settings can enable the administrator to specify different data review processes (e.g., single, parallel, sequential, etc.), customized notifications when milestones are achieved for assignments, or storing documentation to generate a detailed audit trail for the collected data.

The synchronization module 216 processes, packages and distributes the application templates 208 to generate application configuration data 209. The application configuration data 209 can include all necessary data to enable the client device 130 to configure and run the application in various application environments as described above with respect to FIG. 1. For example, in some instances, the application configuration data 209 can include one or more of the application configuration data 104a, 104b, or 104c.

The synchronization module 216 distributes the application configuration data 209 to the client device 130 over a computer network (e.g., the network 105). As described above, in some implementations, the synchronization module 218 maintains persistent connectivity with the client device 130 such that data packets are exchanged periodically (or in real-time) between the application server 110 and the client device 130. Alternatively, in other implementations, the synchronization module 216 is configured to exchange communications with the client device 130 at specified time periods (e.g., prior to an upcoming investigative deployment, or after completing an investigative deployment).

The client device 130 then configures and executes a modular application associated with the application templates 208 based on packaged data within the application configuration data 209. For instance, if the application is not presently running as an active or background process on the operating system of the client device 130, then the client device 130 configures the modular application once a user manually loads the modular application after the client device receives the application templates. In such instances, once the user activates the modular application, the client device 130 accesses the stored application templates 208 and configures the modular application automatically (e.g., without receiving user input to configure the modular application) or manually (e.g., after the user has provided a user input indicating that he/she would like to reconfigure the application).

Alternatively, if the modular application is currently running as a background process on the client device 130 when the application templates 208 are received, the client device 130 may perform the configuration based on whether the modular application is running as an active or manual process. For example, if the modular application is running as a background process, then the client device 130 may automatically or manually configure the modular application based on the application templates 208 as described above.

If the modular application is running as an active process (e.g., the user is currently using the modular application when the application templates 208 are received), then the client device 130 may delay the reconfiguration of the modular application to prevent disrupting the user's experience on the modular application. As described above, the application can be executed in different application environments (e.g., a connected application instance, a locally stored application instance, or a webpage portal as depicted in FIG. 1).

The client device 130 also stores data 212a collected through the application. For example, the client device 130 may collect survey data submitted by an investigator during investigative deployment, real-time geospatial data of the client device 130, user interaction and/or activity data through the application (e.g., click-tracking data, time spent on different application pages, etc.), among other types of data.

The client device 130 uploads the collected data 212a to the synchronization module 216 when it is capable of exchanging communications with the application server 110 over a computer network (e.g., the network 105). In the example of a connected application instance, the client device 130 periodically uploads the collected data 212a to the synchronization module 216 (e.g., in near real-time, at a fixed time interval between uploads, or based on manual sync instructions sent by user). In the example of a locally stored application instance, the client device 130 only uploads the collected data 212a at a specified time point when the client device 130 regains network connectivity after completing an investigative deployment.

The application server 110 also includes a task scheduler module (not shown) that performs asynchronous processing of specified tasks such as aggregating data obtained by the synchronization module 216, sending workflow triggered emails or notifications, among others. For example, the task scheduler module processes the collected data 212a to generate aggregated data 212b. The task scheduler module may use various data mining and filtering techniques to process raw information included within the collected data 212a and generate the aggregated data 212b. For example, the task scheduler module can aggregate data of multiple packets received from an individual client device over a particular time period corresponding to a deployment. In another example, the task scheduler module aggregates data of multiple packets received from multiple client devices that are deployed to a particular geographical region or multiple client devices that are associated with the same deployment. In this example, the task scheduler module is capable of using clustering techniques to identify different groups of client devices that collect commonly associated data.

In some implementations, the synchronization module 216 is provided as a service through a web server that is distinct from the application server 110. In such implementations, the synchronization module 216 can operate based on communications exchanged between the application server 110 and the web server that provides the synchronization module 216. In such implementations, the collected data 212a is processed and handled at the web server. Alternatively, in other implementations, the synchronization module 216 is provided as a service by a computing system that is a component of the application server 110.

The client device 130 also collects geospatial data 212c after configuring and running the modular application. As described in greater below with respect to FIG. 3, the geospatial data 212c can include a determined location of the client device 130 (e.g., latitude and longitude coordinates) that are collected based on exchanging communications with the GIS module 218. The GIS module 218 monitors a determined location of the client device 130 based on exchanging communications with the client device 130 over, for example, a satellite and/or cellular network. For example, a global positioning system (GPS) satellite associated with the GIS module 218 may broadcast a microwave signal to enable a GPS receiver of the client device 130 to determine its location.

In some implementations, the GIS module 218 is implemented on a web server that is distinct from the application server 110. In such implementations, the geospatial data 212c can be collected by the client device 130 based on exchanging communications directly with the web server, or by exchanging communications with the web server through the application server 110 as an intermediary device. In addition, the entity that manages the web server may be a third-party that is distinct from an entity that manages the application server 110 and the organization that manages the administrator system (e.g., a third-party organization that provides packaged integrated mapping services).

In some implementations, the application server 110 includes an analysis module that is also capable of using learning recognition techniques to identify data trends, patterns, and/or other collective attributes indicated within the aggregated data 212b. For example, the analysis module may identify data patterns based on comparing information within historical data stored within the repositories 112 and information within the aggregated data 212b. In other examples, the analysis module is capable of re-packaging and/or re-formatting the aggregated data 212b to be capable of being used with COTS business intelligence and analytics software on an external device.

In some implementations, the publishing module 216 and the synchronization module 216 are capable of providing electronic content to the client device 130 using a RESTful application package interface (API), which is capable of supporting JSON and/or Extensible Markup Language (XML)-based client devices. In such implementations, the publishing module 216 and the synchronization module 216 are capable of exchanging data communications with different types of client devices and enabling collaborative tools for enabling multiple client devices to exchange collected data.

Figure 2B:
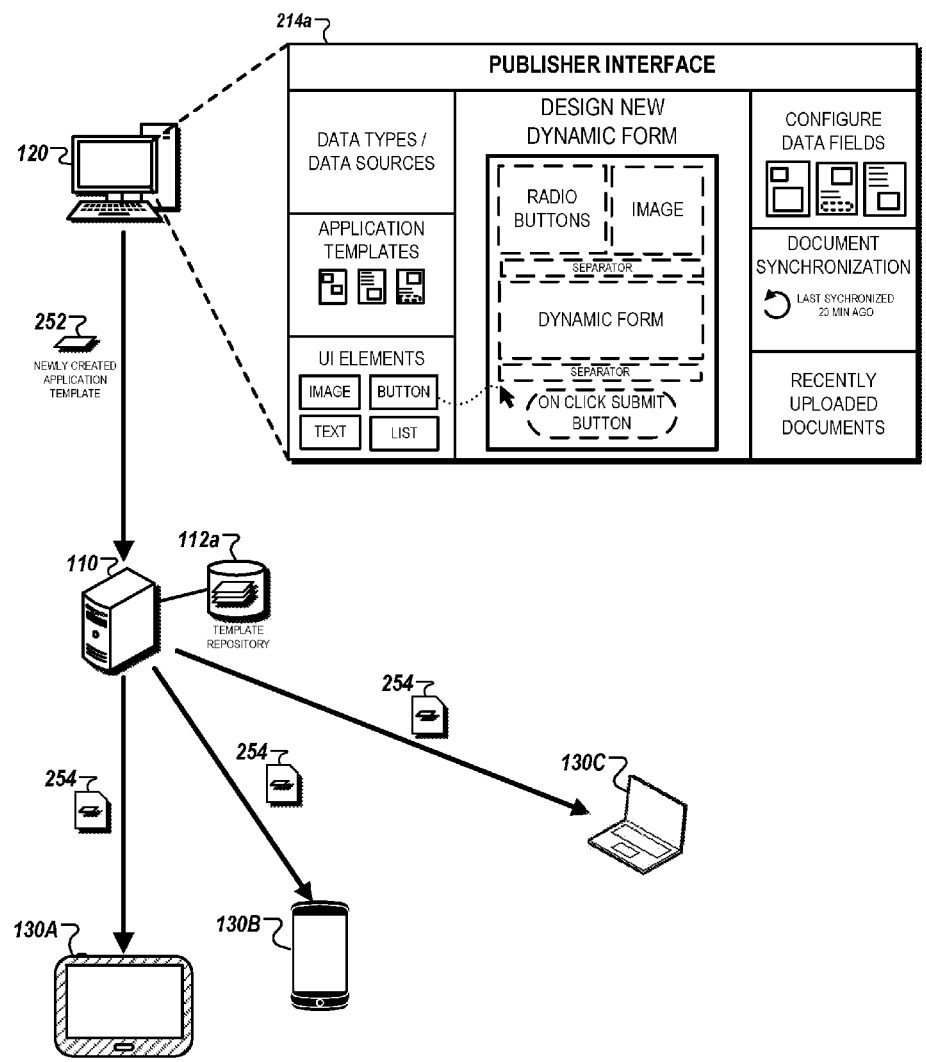
FIG. 2B illustrates an example of a technique for generating application templates for configuring a modular application.

FIG. 2B illustrates an example of technique for generating application templates for configuring a modular application. In the example, an administrator of a particular organization initially specifies various settings and communications for the modular application on a publisher interface 214a provided on the administrator system 120. The administrator system 120 then generates an application template 252 based on the specified settings on the publisher interface 214a and transmits the application template 252 to the application server 110. The applications server 110 stores the application template 252 within a template repository 112a. The application server 110 also generates application configuration data 254, which is then transmitted to client devices 130A, 130B, and 130C, respectively. The client devices 130A, 130B, and 130C each configures the modular application as described above.

In the example depicted, a single configuration file (e.g., the application configuration data 254) that includes settings for different types of client devices is transmitted to the client devices 130A, 130B, and 130C. In this example, a rendering engine of the client device determines the applicable settings within the configuration file to use in configuring the modular application. Alternatively, in some implementations, different configuration files can be generated for each client type and transmitted for a corresponding device type. In such implementations, each of the client devices 130A, 130B, and 130C obtain different configuration data files that correspond to its device type.

In more detail, an administrator may use the publisher interface 214a to specify a variety of settings, functions, and/or features for the modular application. For instance, as described above, the administrator may specify a desired application environment to run the application (e.g., a connected application instance, an application instance locally stored in the client device, etc.) that corresponds to the surrounding environment of a deployment during which the application is to be used. In another example, the administrator may select the types of client device to execute the application (e.g., a smartphone, a tablet computing device, a laptop computing device, etc.) and specific device-specific configuration settings associated with each device type (e.g., an operating system that runs on a device type, compatible application frameworks and services, etc.). In each of these examples, input provided by the administrator on the publisher interface 213a defines the techniques used by the client devices 130A, 130B, and 130C to configure and/or execute the modular application.

The administrator can also specify various customization parameters to customize various user interface elements that are displayed on the modular application. The customization parameters can include organization-specific information or configurations that enable the modular application to be used to meet the specific needs and/or requirements of the particular organization associated with the administrator. For example, the administrator can create content to display on the modular application (e.g., surveys, questionnaires, data forms), specify the arrangement of different content items on the modular application, among others. As illustrated in FIG. 2B, the layout of the publisher interface 214a can allow an administrator to design a new dynamic form in a simple manner. In this regard, the publisher interface 214a can provide a user-friendly interface with a high ease of use so that an individual with limited technical and/or programming experience can efficiently design various settings related to the modular application.

Figure 3:
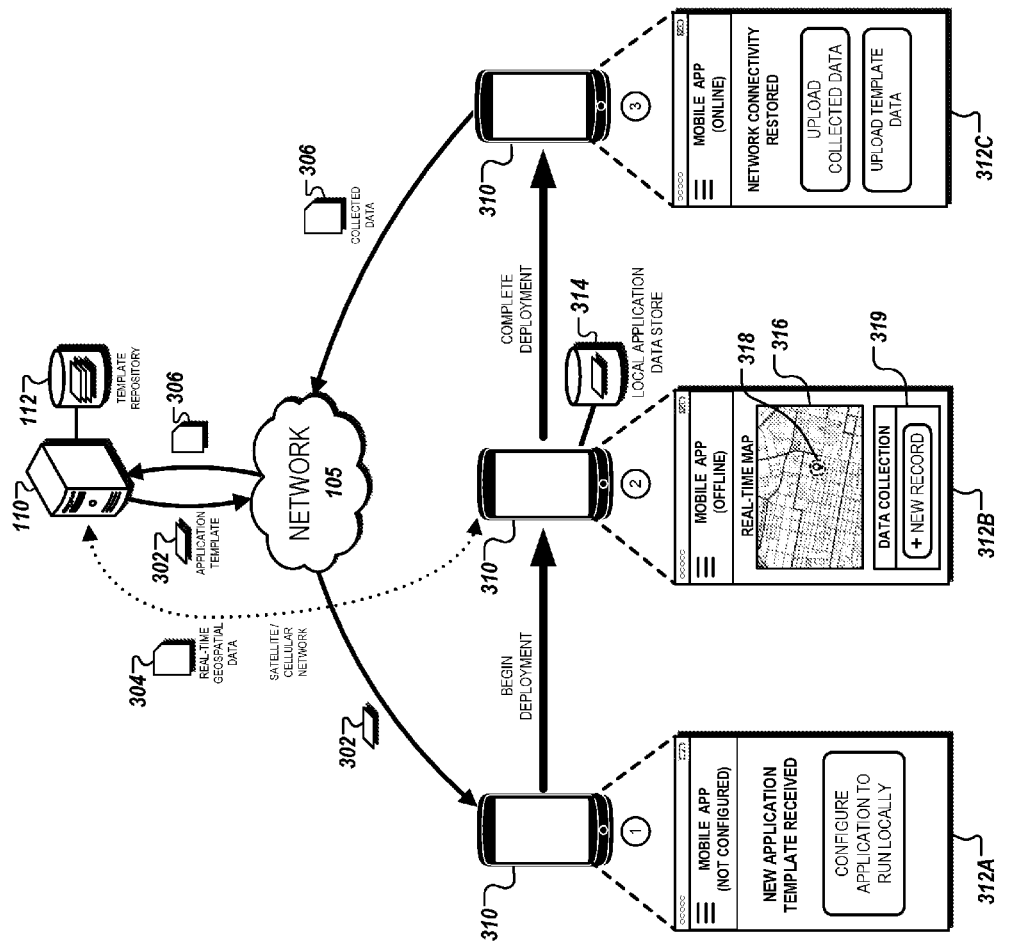
FIG. 3 illustrates an example of a technique for configuring and executing a locally stored instance of a modular application within a network-constrained application environment.

FIG. 3 illustrates an example of a technique for configuring and executing an instance of a modular application locally stored in a client device that is within a network-constrained application environment. The technique proceeds in three stages, which are represented in the figure as stages "(1)," "(2)," and "(3)." Each stage in the figure represents a distinct time point in relation to an investigative deployment mission performed by an organization. For example, stage (1) represents the configuration of the modular application prior to a deployment, stage (2) represents the application configuration during the deployment, and stage (3) represents the application configuration after the deployment.

In general, the client device 310 configures and runs the modular application based on data included within an application template 302 obtained from the application server 110. A user initially manually executes the modular application (e.g., by selecting a graphical representation such as an icon displayed in a graphical desktop, or actuating the icon through use of, for example, a point device such as a mouse or through a touch input on a touch-sensitive surface of the client device 310). The client device 310 then configures the modular application according to the application template 302.

The client device 310 can also configure the application based on whether it is presently being run as an active or a background process on the client device 310. For example, if the modular application is running as a background process, then the client device 130 may automatically configure (e.g., without receiving user input to configure the modular application) or manually configure (e.g., after the user has provided a user input indicating that he/she would like to reconfigure the application) the modular application. If the modular application is running as an active process (e.g., the user is currently using the modular application when the application templates 208 are received), then the client device 130 may delay the reconfiguration of the modular application to prevent disrupting the user's experience on the modular application.

As described above with respect to FIGS. 2A and 2B, the application template 302 is initially stored in the template repository 112a once an administrator has specified various settings for the modular application on a publisher interface provided by the application server 110 (e.g., the publisher interface 122). The application template 302 includes a collection of data, files, and/or specifications that enable the client device 310 to configure and run the modular application.

In the example depicted, the client device 310 runs a locally stored instance of a modular application independently of connectivity to the application server 110 over the network 105. As described above with respect to FIG. 1, a locally stored instance refers to an application instance that is executed on the client device 310 based primarily on locally stored data and with limited or, in some implementations, no reliance on the application server 110 or connectivity to the network 105.

In more detail, at stage (1), the client device 310 initially obtains the application template 302 from the application server 110 over the network 105. The client device 310 then provides an interface 312A through the modular application. In the example, the interface 312A informs a user that the application template 302 has been received by the client device 310, and requests the user to provide a user input to configure the modular application to run locally.

Once the user provides the user input, the client device 310 then processes the contents of the application template 302 to configure the modular application for execution in stage (2). The client device 310 can reconfigure the framework of the modular application by adjusting any application dependencies to the application server 110 with references to corresponding files included within the application template. As an example, an application component that is previously configured to request up-to-date data from the application server 110 to generate a display element can be reconfigured to obtain data from storage associated with the client device 310.

In some implementations, the client device 310 also disables certain application components that require connectivity to the application server 110 and/or dependencies to application components that require connectivity to the application server 110. For example, an application component that provides secondary functionalities (e.g., non-essential functionalities) that are dependent on network connectivity can be disabled in order to remove the likelihood of any application dependencies that can cause bugs and/or defects in application functionality once the application has been reconfigured. In another example, dynamic application components (e.g., components whose appearance, configuration, or functionality changes based on data obtained by the modular application) can be adjusted to become static application components that are configured based on the most recently received data from the application server 110.

At stage (2), the client device 310 has limited network connectivity to the network 105 because, for example, the user associated with the client device 310 has been deployed to a remote field site for an investigative deployment. At this stage, the client device 310 runs a locally stored instance of the modular application based on data stored within a local application data store 314 as described above. The client device 310 then provides an interface 312B through the locally stored instance of the modular application.

In the example, the interface 312B provides a map 316 that allows the user to view and track geospatial location 318 associated with the client device 310, and submit various types of investigative data associated with the current deployment. The map 316 can be a cached map file that provides displays static geographic data (e.g., terrain data, topographical information, points of interest, etc.) in relation to a determined geospatial location based on, for example, a GPS and/or satellite signal collected for the client device 310.

The interface 312B also includes various data fields 319 where a user can collect or submit different types of investigative data described above. Examples of investigative data collected through the data fields 319 can include observational data associated with a present monitored threat, participants' responses to surveys associated with the deployment, notes collected by the user participating in the deployment, among other types of investigational data. The data fields 319 can include pre-determined data fields that are specified by the application template 302 or custom data fields that are added and/or modified by the user participating in the deployment.

During the locally stored instance of the modular application, the client device 130 selectively transmits certain types of data to the application server 110, while preventing the transmission of other types of data. For instance, in the example, the client device 310 transmits geo-spatial data 304 that is collected in real-time based on a satellite signal associated with the client device 130 to the application server 110 via another network aside from the network 105 (e.g., a cellular network, a satellite network, or a combination of both). The client device 310 does not, however, transmit data submitted and/or collected on the data fields 319 (e.g., images, video, documents, or other large files that are collected during the course of an investigation).

The selective data transmission configuration in the example is designed based on costs associated with data transmission during time periods of limited network connectivity. As described above, the costs associated with data transmission over the alternative networks can be significantly higher compared to costs associated with data transmission over the network 105. As a result, in this example, the organization that performs the investigative deployment has determined that the costs of transmitting data included within the data fields 319 in real-time are prohibitively expensive compared to the any benefits derived from the data transmission.

The selective transmission configuration of the geospatial data 304 in this example enables the application server 110 to track the location of the client device 310 during the deployment without necessarily requiring the upload of data collected during the deployment. For example, the geospatial data 304 can be used to determine if the user proceeds along a designated route that is associated with the deployment. In other examples, the application server 110 can use the geospatial data 304 infer on-the-ground deployment conditions. For instance, the application server 110 can determine if the user may be in danger if the geospatially determined location 318 is within hostile or dangerous territory.

In some implementations, the transmission of the geospatial data 304 can be used to identify other client devices that are nearby to the client device 310 but may be otherwise unknown to the user associated with the client device 310. In such implementations, upon determining that two or more client devices are within a threshold proximity to one another, the application server 110 transmits notifications to each of the client devices over the alternative network. The detected locations for the other client devices can then be superimposed onto the map 318 to indicate to the user that other client devices are nearby. As an example, during a natural disaster response deployment, the techniques described above can be used to identify other nearby responders that can potentially assist a responder that requires assistance.

At step (3), the user associated with the client device 310 has returned from the deployment and has regained connectivity to the application server 110 over the network 105. At this stage, the client device 310 no longer needs to run the local instance of the modular application because it has regained network connectivity. In response, the client device 310 provides an interface 310C that provides the user with options to perform specified actions.

In the example, the interface 312C provides an option to upload data collected by the user through the locally stored instance during the deployment, and an option to upload data associated with the application template 302 (e.g., application performance data, error logs of the locally stored application instance, etc.). Upon receiving a user input to upload the collected data, the client device 310 transmits collected data 306 to the application server 110 over the network 105. In this regard, the delayed transmission of the collected data 306 until the client device 310 has regained network connectivity limits the bandwidth consumption of the alternative network during time periods of limited network activity thereby potentially reducing costs associated with data transmission.

In some implementations, instead of initiating the data upload in response to user input, as depicted in the figure, the client device 310 may automatically upload the collected data 309. For instance, the client device 310 may use its real-time geospatial location to determine if the client device 310 has left a designated region associated with the deployment, and in response, attempt to connect with the network 105. Once the client device 310 has established a network connection over the network 105, the client device 310 then automatically uploads the collected data 309 onto the application server 110 (e.g., through the synchronization module 216 as described above with respect to FIG. 2A).

In some implementations, the client device 310 may determine to upload the collected data 309 onto the application server 110 only if certain conditions are satisfied. For example, as described above, the client device 310 may execute different transmission schemes if, for example, the client device 310 is connected over a wired or wireless network, if the network speed of the connected network exceeds a threshold speed, or if the client device 310 is presently located in a designated location. In some implementations, the client device 310 may also use various prioritization techniques when uploading the collected data 309 to the application server 110. For example, the client device 310 may generate a transmission that uploads high-priority data (e.g., status data associated with a monitored threat) prior to low-priority data (e.g., survey data related to routine practices or conditions).

Figure 4A:
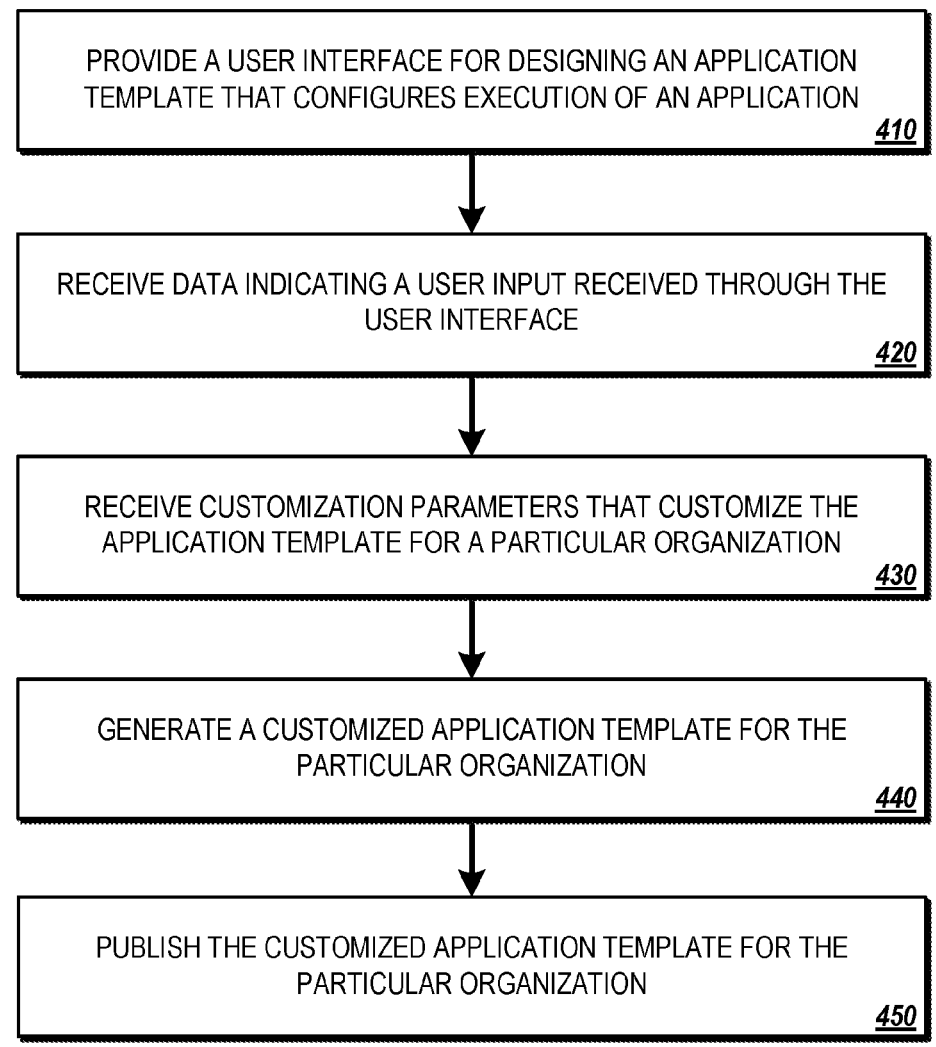
FIG. 4A illustrates an example of a process for configuring a local instance of a modular application.

FIG. 4A illustrates an example of a process 400A for configuring a local instance of a modular application. Briefly, the process 400A can include providing a user interface for designing an application template that configures execution of an application (410), receiving data indicating a user input received through the user interface (420), receiving customization parameters that customize the application template for a particular organization (430), generating a customized application template for the particular organization (440), and publishing the customized application template for the particular organization (450).

In more detail, the process 400A can include providing a user interface for designing an application template that configures execution of an application (410). The application server 110 may provide the publisher interface 214a for output on the administrator system 120. As described above, an administrator may use the publisher interface 214a to design various aspects of a modular application to be executed in various application environments. For example, the administrator may specify application functions, capabilities, and/specifications. In other examples, the administrator may configure security settings for running the application, specify business workflow management features, or configure user interface elements that are displayed through the modular application.

The process 400A can include receiving data indicating a user input received through the user interface (420). For instance, as shown in the example illustrated in FIG. 2A, the application server 110 may receive data indicating user input received through the publisher interface 214a. As described above, the received user input can indicate selected features, functions, or configurations for the modular application that are specified by the administrator.

The process 400A can include receiving customization parameters that customize the application template for a particular organization (430). For instance, the application server 110 may receive customization parameters that are used to customize the application template 252 for a particular organization associated with the administrator system 120. The customization parameters can include organization-specific information that is used to configure the modular application to be used to need the specific needs and/or requirements of the organization. For example, the customization parameters may specify data format standards that enable the modular application to be used with existing systems associated with the administrator system 120.

The process 400A can include generating a customized application template for the particular organization (440). For instance, the application server 110 may use the selected settings for the modular application corresponding to the administrator's user input on the publisher interface 214a and the customization parameters for the modular application to create the application template 252. As described above, the application template 252 can include a collection of data files, and/or specifications that enable the client device 310 to configure and run the modular application. In some implementations, the application template 252 can specify different runtime configurations for the modular application in different application environments (e.g., for different types of client devices as shown in FIG. 2A).

The process 400A can include publishing the customized application template for the particular organization (450). For instance, the application server 110 may publish the application template 252 by distributing application configuration data to different types of client devices that execute the modular application. As shown in the example illustrated FIG. 2A, the application server 110 may distribute application configuration data 254a, 254b, and 254c to each of the client devices 130A, 130B, and 130C. In this example, each of the configuration data 254a, 254b, and 254c can specify various configuration settings for each type of client device.

Figure 4B:
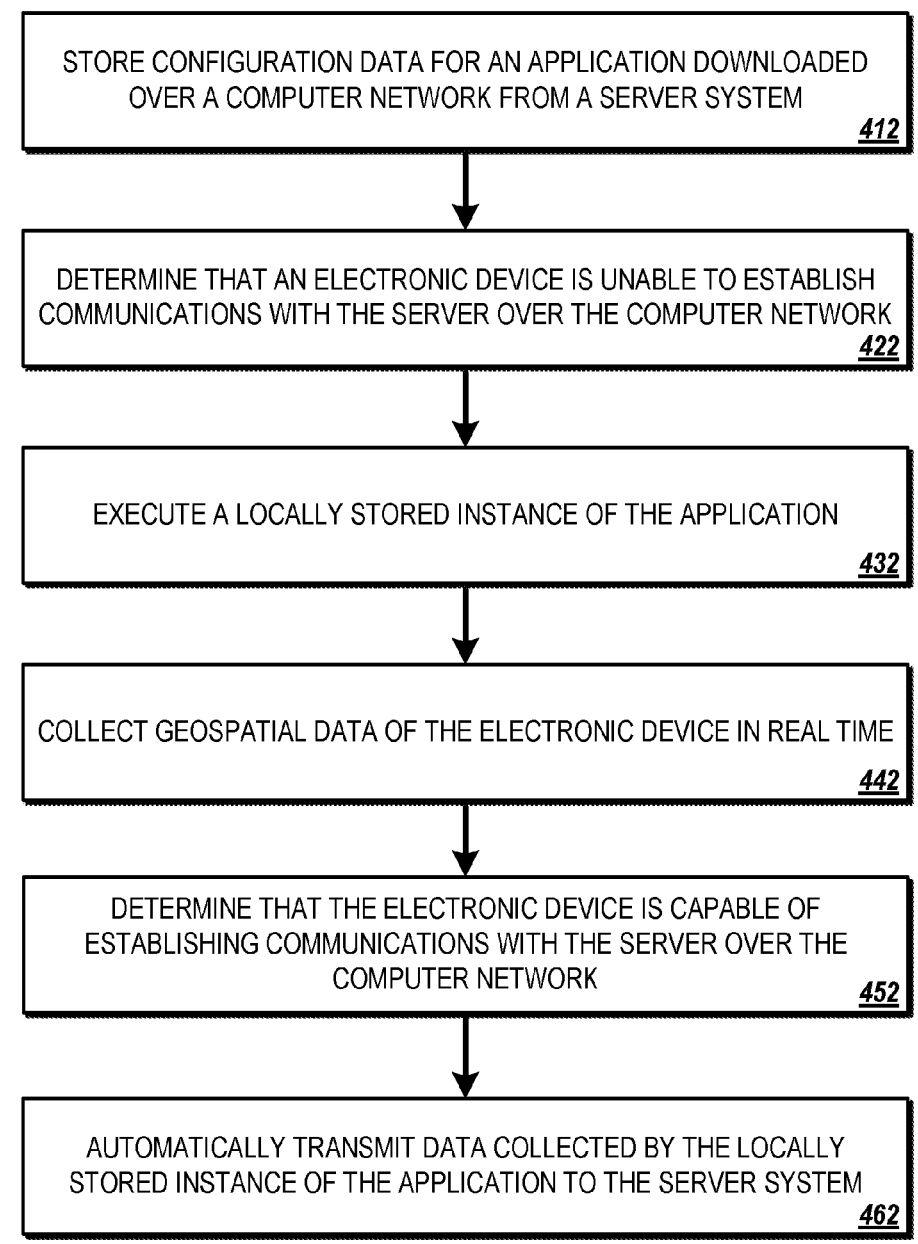
FIG. 4B illustrates an example of a process for executing a local instance of a modular application.

FIG. 4B illustrates an example of a process 400B for executing a local instance of a modular application. Briefly, the process 400B can include storing configuration data for an application downloaded over a computer network from a server system (412), determining that an electronic device is unable to establish communications with the server over the computer network (422), executing a locally stored instance of the application (432), collecting geospatial data of the electronic device in real-time (442), determining that the electronic device is capable of establishing communications with the server over the computer network (452), and automatically transmitting data collected by the locally stored instance of the application to the server system (462).

In more detail, the process 400B can include storing configuration data for an application downloaded over a computer network from a server system (412). For instance, as shown in the example illustrated in FIG. 3, the client device 310 receives configuration data that includes the application template 302 over the network 105 from the application server 110. The client device 310 then stores the application configuration data in associated storage such as the local application data store 314. The data stored within the local application data store 314 can be used to configure the modular application at a specified time point.

The process 400B can include determining that an electronic device is unable to establish communications with the server over the computer network (422). For instance, in the example illustrated in FIG. 3, the user associated with the client device 310 has been deployed to a remote field site to conduct an investigative operation. In this example, the location has limited network connectivity and as a result, the client device 310 determines that it is unable to establish communications with the application server 110 over the network 105.

The process 400B can include executing a locally stored instance of the application (432). For instance, in response to determining that the client device 310 is unable to establish communications with the application server 110 over the network 105, the client device 310 configures the modular application to run a locally stored instance. As described above, the client device 310 configures the locally stored instance of the modular application by reconfiguring and/or adjusting any frameworks, services, or any other application components of the modular application that are dependent on either connectivity to network 105 or communications with the application server 110. The client device 310 then executes the application based on the configuration data stored in the local application data store 314.

The process 400B can include collecting geospatial data of the electronic device in real-time (442). For instance, the client device 310 collects geospatial data 304 in real-time while running a locally stored instance of the modular application. As described above, the geospatial data 304 can be collected based on an alternative network connection such as connection to a cellular network or a satellite network. The geospatial data 304 can be transmitted to the application server 110 using the alternative network to enable the application server 110 to track the current location of the client device 310 throughout the duration of a deployment. In the example depicted in FIG. 3, only the geospatial data 304 is transmitted over the alternative network to reduce bandwidth consumption and associated costs of data transmission, as well as improve the performance of the locally stored application instance.

The process 400B can include determining that the electronic device is capable of establishing communications with the server over the computer network (452). For instance, in the example illustrated in FIG. 3, once the user associated with the client device 310 has exited the deployment to the remote field site, the client device 310 determines that it is capable of establishing communications with the application server 110 over the network 105.

The process 400B can include automatically transmitting data collected by the locally stored instance of the application to the server system (462). For instance, in response to determining that it is capable of establishing communications with the application server 110, the client device 310 uploads the data 306 collected by the locally stored instance of the modular application to the application server 110 over the network 105. As described above, the client device 310 may use different transmission schemes based on, for example, the current bandwidth availability of the network 105, the importance of the collected data 306, among other factors. The data can be uploaded based on a manual upload instruction by the user or automatically based the satisfaction of one or more specified conditions or triggers specified by the synchronization module 216 of the application server.

Figure 5:
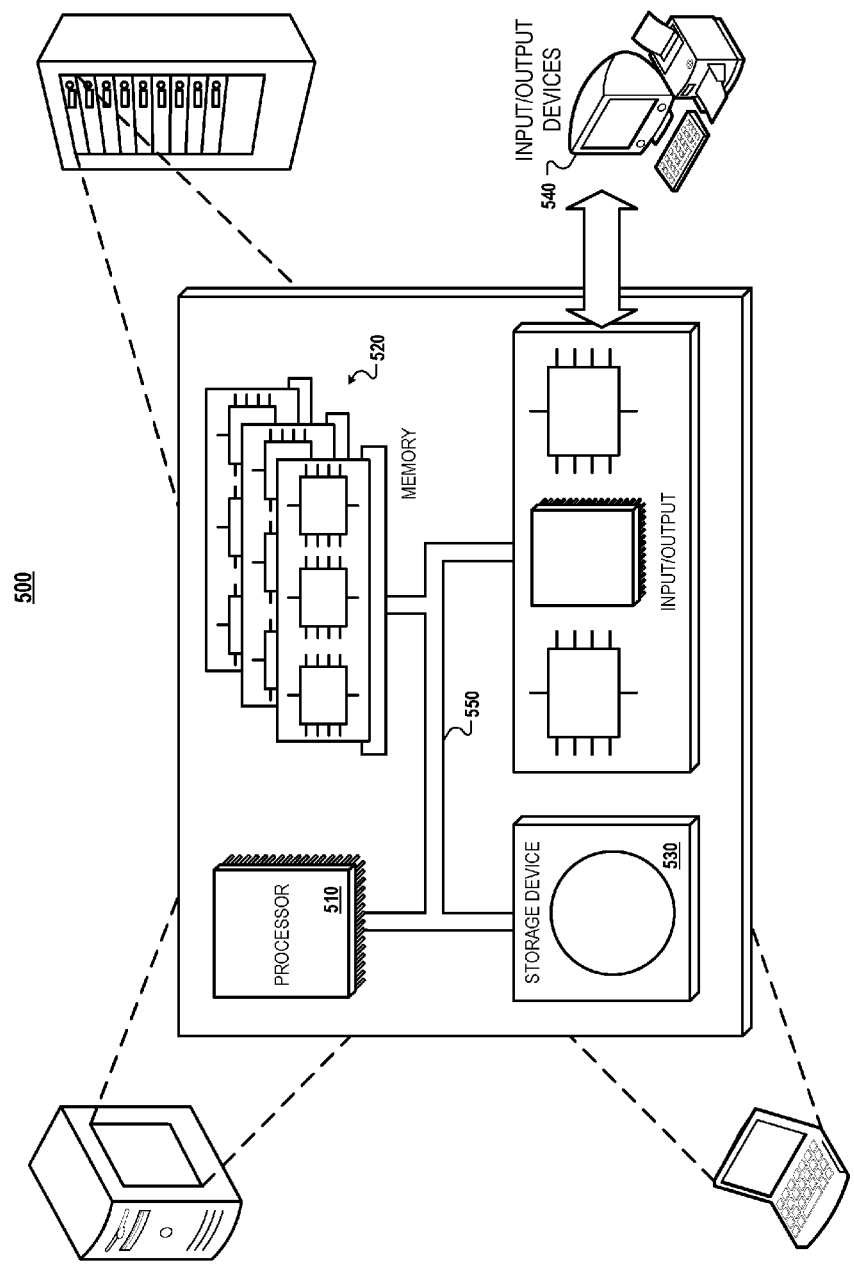
FIG. 5 illustrates examples of computing devices on which the processes described herein, or portions thereof, can be implemented.

FIG. 5 illustrates examples of computing devices on which the processes described herein, or portions thereof, can be implemented. Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and can be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses can be used, as appropriate, along with multiple memories and types of memory. Also, multiple computing devices 500 can be connected, with each device providing portions of the necessary operations, e.g., as a server bank, a group of blade servers, or a multi-processor system.

The memory 504 stores information within the computing device 500. In one implementation, the memory 504 is a volatile memory unit or units. In another implementation, the memory 504 is a non-volatile memory unit or units. The memory 504 can also be another form of computer-readable medium, such as a magnetic or optical disk.

The storage device 506 is capable of providing mass storage for the computing device 500. In one implementation, the storage device 506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth intensive operations. Such allocation of functions is exemplary only. In one implementation, the high-speed controller 508 is coupled to memory 504, display 516, e.g., through a graphics processor or accelerator, and to high-speed expansion ports 510, which can accept various expansion cards (not shown). In the implementation, low-speed controller 512 is coupled to storage device 506 and low-speed expansion port 514. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 500 can be implemented in a number of different forms, as shown in the figure. For example, it can be implemented as a standard server 520, or multiple times in a group of such servers. It can also be implemented as part of a rack server system 524. In addition, it can be implemented in a personal computer such as a laptop computer 522. Alternatively, components from computing device 500 can be combined with other components in a mobile device (not shown), such as device 550. Each of such devices can contain one or more of computing device 500, 550, and an entire system can be made up of multiple computing devices 500, 550 communicating with each other.

The computing device 500 can be implemented in a number of different forms, as shown in the figure. For example, it can be implemented as a standard server 520, or multiple times in a group of such servers. It can also be implemented as part of a rack server system 524. In addition, it can be implemented in a personal computer such as a laptop computer 522. Alternatively, components from computing device 500 can be combined with other components in a mobile device (not shown), such as device 550. Each of such devices can contain one or more of computing device 500, 550, and an entire system can be made up of multiple computing devices 500, 550 communicating with each other.

Computing device 550 includes a processor 552, memory 564, and an input/output device such as a display 554, a communication interface 666, and a transceiver 568, among other components. The device 550 can also be provided with a storage device, such as a microdrive or other device, to provide additional storage. Each of the components 550, 552, 564, 554, 566, and 568, are interconnected using various buses, and several of the components can be mounted on a common motherboard or in other manners as appropriate.

The processor 552 can execute instructions within the computing device 550, including instructions stored in the memory 564. The processor can be implemented as a chipset of chips that include separate and multiple analog and digital processors. Additionally, the processor can be implemented using any of a number of architectures. For example, the processor 510 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 550, such as control of user interfaces, applications run by device 550, and wireless communication by device 550.

Processor 552 can communicate with a user through control interface 458 and display interface 456 coupled to a display 554. The display 554 can be, for example, a TFT (Thin-Film-Transistor Liquid Crystal Display) display or an OLED (Organic Light Emitting Diode) display, or other appropriate display technology. The display interface 556 can comprise appropriate circuitry for driving the display 554 to present graphical and other information to a user. The control interface 558 can receive commands from a user and convert them for submission to the processor 552. In addition, an external interface 562 can be provide in communication with processor 552, so as to enable near area communication of device 550 with other devices. External interface 562 can provide, for example, for wired communication in some implementations, or for wireless communication in other implementations, and multiple interfaces can also be used.

The memory 564 stores information within the computing device 550. The memory 564 can be implemented as one or more of a computer-readable medium or media, a volatile memory unit or units, or a non-volatile memory unit or units. Expansion memory 574 can also be provided and connected to device 550 through expansion interface 572, which can include, for example, a SIMM (Single in Line Memory Module) card interface. Such expansion memory 574 can provide extra storage space for device 550, or can also store applications or other information for device 550. Specifically, expansion memory 574 can include instructions to carry out or supplement the processes described above, and can include secure information also. Thus, for example, expansion memory 574 can be provide as a security module for device 550, and can be programmed with instructions that permit secure use of device 550. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that can be received, for example, over transceiver 568 or external interface 562.

Device 550 can communicate wirelessly through communication interface 566, which can include digital signal processing circuitry where necessary. Communication interface 666 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 668. In addition, short-range communication can occur, such as using a Bluetooth, Wi-Fi, or other such transceiver (not shown). In addition, GPS (Global Positioning System) receiver module 570 can provide additional navigation- and location-related wireless data to device 550, which can be used as appropriate by applications running on device 550.

Device 550 can also communicate audibly using audio codec 560, which can receive spoken information from a user and convert it to usable digital information. Audio codec 560 can likewise generate audible sound for a user, such as through a speaker, e.g., in a handset of device 550. Such sound can include sound from voice telephone calls, can include recorded sound, e.g., voice messages, music files, etc. and can also include sound generated by applications operating on device 550.

The computing device 550 can be implemented in a number of different forms, as shown in the figure. For example, it can be implemented as a cellular telephone 580. It can also be implemented as part of a smartphone 582, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computer-implemented method comprising:
    providing, by a server system, a user interface for designing an application template that configures execution of an application on multiple different types of electronic devices, wherein the user interface identifies multiple configuration settings for the application template;
    receiving, by the server system, data indicating a user input received through the user interface that selects one or more of the multiple configuration settings for the application template;
    receiving, by the server system, customization parameters that customize the application template for a particular organization;
    generating, by the server system, a customized application template for the particular organization based on the selected one or more of the multiple configuration settings for the application template and the customization parameters, wherein the customized application template for the particular organization comprises instructions that, based on detecting that an electronic device is unable to establish communications with the server system over a first network, cause the electronic device to:
        (i) execute a local instance of the application specified by a device type of the electronic device from among the multiple different types of electronic devices,
        (ii) configure the local instance of the application to permit collection of user input data through the local instance of the application on the electronic device, and
        (iii) adjust a network configuration of the local instance of the application to permit transmission of geospatial data collected in real-time to the server system over a second network; and
    publishing, by the server system, the customized application template for the particular organization.

2. The computer-implemented method of claim 1, wherein the multiple configuration settings for the application template comprise a list of predetermined user-selectable configuration settings for the application template.

3. The computer-implemented method of claim 1, wherein the user interface for designing the application template additionally identifies a set of data synchronization configurations for the application.

4. The computer-implemented method of claim 1, wherein the customization parameters comprise information related to investigative deployments that are conducted by the particular organization.

5. The computer-implemented method of claim 4, wherein the customization parameters specify one or more application environments associated with the investigative deployments that are conducted by the particular organization.

6. The computer-implemented method of claim 1, wherein the multiple configuration settings for the application template comprise:
   a first set of instructions to execute the application while an electronic device is unable to establish communications with the server system, and
   a second set of instructions to execute the application while the electronic device is capable of establishing communications with the server system.

7. The computer-implemented method of claim 1, further comprising:
   detecting, by the server system, that the electronic device is unable to establish communications with the server system over the first network; and
   monitoring, by the server system, a real-time location of the electronic device after detecting that the electronic device is unable to establish communications with the server system over the first network.

8. The computer-implemented method of claim 1, wherein the user input data collected through the local instance of the application on the electronic device comprises investigative data collected by an investigator.

9. The computer-implemented method of claim 8, further comprising:
   determining, by the server system, a predicted environmental condition of the electronic device based on the geospatial data transmitted by the electronic device over the second network, wherein the predicted environmental condition indicates likelihood of a safety risk to the investigator.

10. A system comprising:
   one or more processors; and
   one or more non-transitory computer-readable storage devices storing instructions that, when executed by the one or more processors, cause the system to perform operations comprising:
      providing, by a server system, a user interface for designing an application template that configures execution of an application on multiple different types of electronic devices, wherein the user interface identifies multiple configuration settings for the application template;
      receiving, by the server system, data indicating a user input received through the user interface that selects one or more of the multiple configuration settings for the application template;
      receiving, by the server system, customization parameters that customize the application template for a particular organization;
      generating, by the server system, a customized application template for the particular organization based on the selected one or more of the multiple configuration settings for the application template and the customization parameters, wherein the customized application template for the particular organization comprises instructions that, based on detecting that an electronic device is unable to establish communications with the server system over a first network, cause the electronic device to:
         (i) execute a local instance of the application specified by a device type of the electronic device from among the multiple different types of electronic devices,
         (ii) configure the local instance of the application to permit collection of user input data through the local instance of the application on the electronic device, and
         (iii) adjust a network configuration of the local instance of the application to permit transmission of geospatial data collected in real-time to the server system over a second network; and
      publishing, by the server system, the customized application template for the particular organization.

11. The system of claim 10, wherein the multiple configuration settings for the application template comprise a list of predetermined user-selectable configuration settings for the application template.

12. The system of claim 10, wherein the user interface for designing the application template additionally identifies a set of data synchronization configurations for the application.

13. The system of claim 10, wherein the customization parameters comprise information related to investigative deployments that are conducted by the particular organization.

14. The system of claim 13, wherein the customization parameters specify one or more application environments associated with the investigative deployments that are conducted by the particular organization.

15. The system of claim 10, wherein the multiple configuration settings for the application template comprise:
   a first set of instructions to execute the application while an electronic device is unable to establish communications with the server system, and
   a second set of instructions to execute the application while the electronic device is capable of establishing communications with the server system.

16. One or more non-transitory computer-readable media storing instructions that, when executed by a computing device, cause the computing device to perform operations comprising:
   providing, by a server system, a user interface for designing an application template that configures execution of an application on multiple different types of electronic devices, wherein the user interface identifies multiple configuration settings for the application template;
   receiving, by the server system, data indicating a user input received through the user interface that selects one or more of the multiple configuration settings for the application template;
   receiving, by the server system, customization parameters that customize the application template for a particular organization;
   generating, by the server system, a customized application template for the particular organization based on the selected one or more of the multiple configuration settings for the application template and the customization parameters, wherein the customized application template for the particular organization comprises instructions that, based on detecting that an electronic device is unable to establish communications with the server system over a first network, cause the electronic device to:
      (i) execute a local instance of the application specified by a device type of the electronic device from among the multiple different types of electronic devices,
      (ii) configure the local instance of the application to permit collection of user input data through the local instance of the application on the electronic device, and
      (iii) adjust a network configuration of the local instance of the application to permit transmission of geospatial data collected in real-time to the server system over a second network; and publishing, by the server system, the customized application template for the particular organization.

17. The one or more non-transitory computer-readable media of claim 16, wherein the multiple configuration settings for the application template comprise a list of predetermined user-selectable configuration settings for the application template.

18. The one or more non-transitory computer-readable media of claim 16, wherein the user interface for designing the application template additionally identifies a set of data synchronization configurations for the application.

19. The one or more non-transitory computer-readable media of claim 16, wherein the customization parameters comprise information related to investigative deployments that are conducted by the particular organization.

20. The one or more non-transitory computer-readable media of claim 19, wherein the customization parameters specify one or more application environments associated with the investigative deployments that are conducted by the particular organization.

21. The one or more non-transitory computer-readable media of claim 16, wherein the multiple configuration settings for the application template comprise:
    a first set of instructions to execute the application while an electronic device is unable to establish communications with the server system, and
    a second set of instructions to execute the application while the electronic device is capable of establishing communications with the server system.

* * * * *